Oct. 28, 1947.  L. SPRARAGEN  2,429,900
SHAFT OPERATOR AND LOCK
Filed April 18, 1944
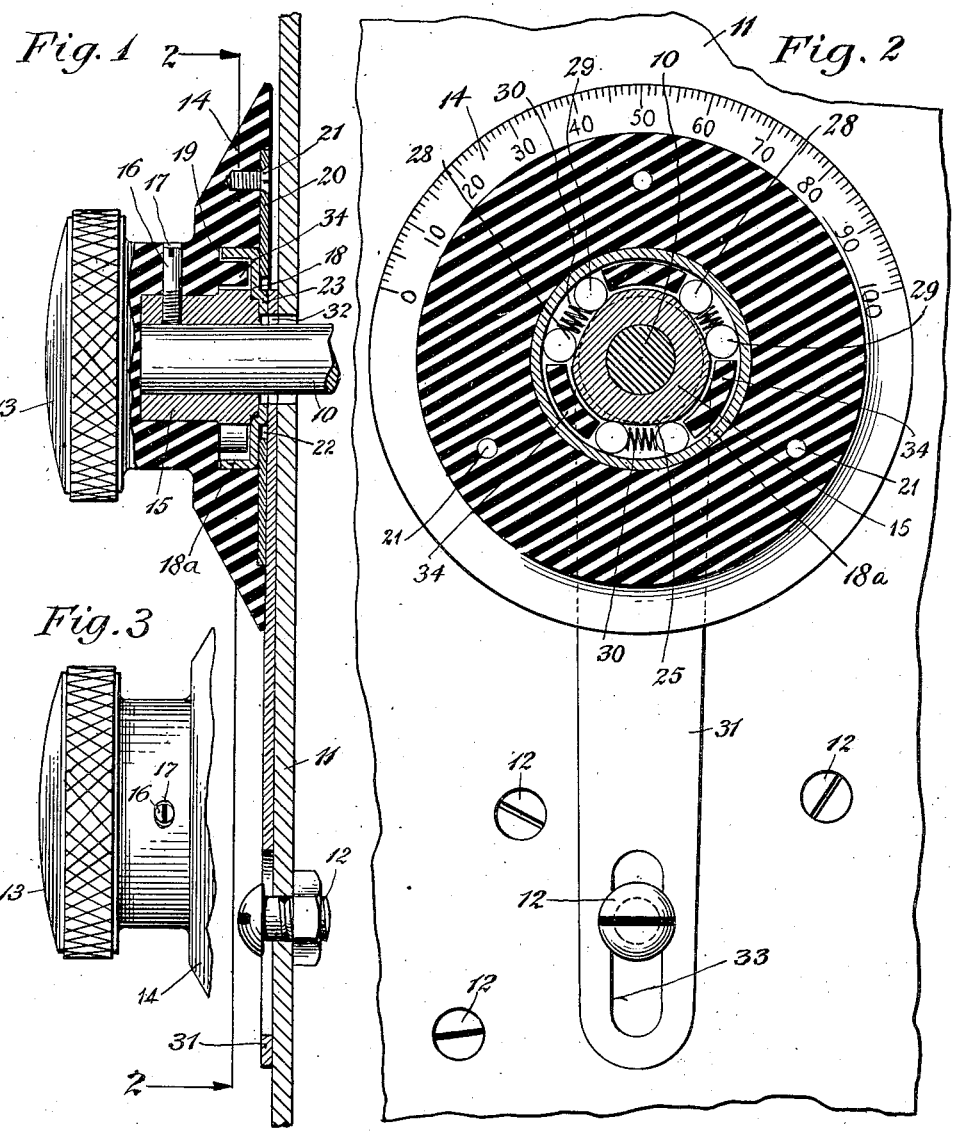
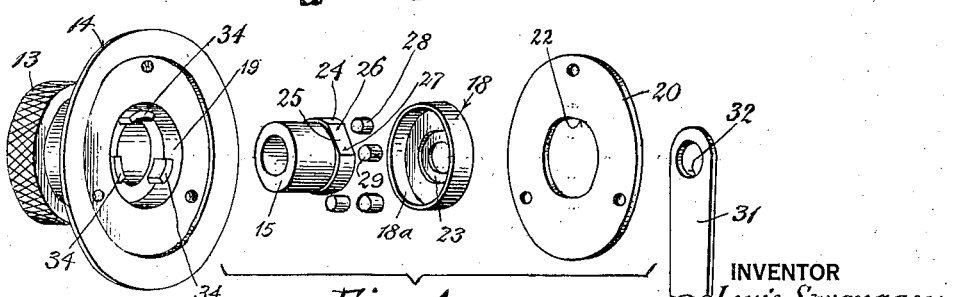
INVENTOR
Louis Spraragen,
BY Johnson + Kline
ATTORNEYS Patented Oct. 28, 1947

2,429,900

UNITED STATES PATENT OFFICE 2,429,900

SHAFT OPERATOR AND LOCK

Louis Spraragen, Bridgeport, Conn., assignor to Automatic Locking Devices, Incorporated, Bridgeport, Conn., a corporation of Connecticut Application April 18, 1944, Serial No. 531,680

16 Claims. (Cl. 192—8)

This invention relates to operating and locking devices for rotatable shafts and the like, and more particularly to a unitary device which may be applied to equipment now in use, to operate and lock rotatable shafts thereof.

Much equipment, especially electrical and radio, is used in many locations where vibration and rough handling are common place. These conditions tend to disturb the settings of the various adjustable devices, such as condensers, variable resistors, etc., of the equipment and it is difficult to obtain uniformly satisfactory results at all times.

An object of the present invention is to provide an operating and locking unit which may be quickly and conveniently attached to equipment now in use so that the various settings of the adjustable instruments thereof may be quickly made, and the instruments automatically locked to insure proper, consistent functioning of the equipment under severe and exacting conditions of use, especially in aircraft and boats.

This is accomplished by the provision of a unit having a finger-operable member adapted to be mounted on the shaft of an instrument or the like, and having an anchor means associated therewith to be fastened to the instrument panel, there being automatically operative locking means between the shaft and the anchor means, and a connection between the finger-operable member and the locking means for rendering the latter inoperative, so that in one motion the shaft may be unlocked and turned in response to turning of the operable member. The arrangement is such that when the member is released, the lock automatically again becomes operative.

In the form of the invention illustrated herein, the finger-operable member comprises a knob and dial, which rotatably carry an anchoring arm extending from same, the arm having means enabling it to be fastened to any selected point on the panel within a predetermined zone spaced from the shaft, so that any pre-existing fastening means located in the zone may be used, obviating the necessity of drilling extra holes in the panel for installation.

Thus, the unit of the present invention may be quickly substituted for the ordinary type knob or dial on equipment now in use, the installation being made generally with simple tools such as a screw driver and pliers.

Also, in the specific form of the invention illustrated, the locking means has separate parts one of which locks the shaft against rotation in one direction, another locking the shaft in the other direction, and the release means operated by the knob selects for release that part of the locking means which unlocks the shaft for movement in the direction of turning of the knob.

A feature of the operating and locking means of this invention is its extreme compactness, small size if desired and simplicity, whereby the entire mechanism of the device with the exception of the anchor arm may be contained in a space no larger than that taken up by the ordinary dial or knob. This makes possible a unitary structure which is readily interchangeable and universally applicable to all types of equipment. Also, the constructional details are such that the entire unit may be easily and quickly assembled, and disassembled for servicing or repair.

Other features and advantages will hereinafter appear.

In the accompanying drawings—

Figure 1 is an axial sectional view partly in elevation, showing the unit of the present invention mounted on a shaft and panel through which the latter projects.

Fig. 2 is a transverse section taken on the line 2—2 of Fig. 1.

Fig. 3 is a fragmentary elevation of the knob of the device.

Fig. 4 is an exploded view showing the various parts of the operating and locking mechanism.

Referring to Figs. 1 and 2, the unitary operating and locking device of the present invention is shown mounted on a shaft 10 of a piece of equipment, and fastened to the panel 11 thereof, through which the shaft extends. The panel and shaft may be part of any mechanical or electrical equipment, as for instance, a hydraulic valve control, or a radio apparatus. Considering the latter, the shaft 10 may be connected to operate a condenser, or a variable resistor, or other adjustable device of the apparatus.

As seen in Fig. 2, the panel 11 may have a plurality of fastening means 12 in the form of screws which may be incidental to the mounting of the shaft 10 and instrument it controls, and which may fasten to other instruments, or to supports and the like of the equipment.

According to the present invention an improved operating and locking unit, which may be mounted on any standard size shaft and quickly connected to existing fastening means located on the panel 11 or any adjacent structure, is provided for the purpose of quickly and conveniently adjusting the shaft 10 to any desired setting and locking same with respect to the panel 11. This unit is adapted to replace existing operating devices without major changes being required in the equipment on which it is installed.

As shown in the drawings, the unit comprises a knob 13 having a graduated dial portion 14 and a centrally located bushing 15 on which the knob is rotatably carried. The bushing 15 has a standard size bore so that it may be mounted directly on the shaft 10 and fixed thereto by a headless set screw 16 which extends through an oblong aperture 17 in the hub of the knob. Clearance is provided between the set screw 16 and the end of the aperture 17 so that the knob is rotatable a very small extent on the bushing 15 between two limits. The screw 16 and aperture 17 therefore function as a lost motion device for purposes stated below, the knob 13 connecting positively at either of said limits to drive the shaft 10.

According to this invention means are provided for automatically locking the bushing 15 to the panel 11 to prevent accidental or casual movement of the shaft 10, this locking means being normally operative when the knob 13 is in a position intermediate its limits, as shown in Fig. 3, wherein the set screw 16 is centralized in the aperture 17. The lock is so constructed that it may be rendered inoperative when the knob 13 is turned to cause the screw 16 to engage one end or the other of the aperture 17.

For this purpose a brake or locking drum 18 is provided, rotatably mounted on the rearward end of the bushing 15, and the dial 14 has a cylindrical recess 19 in its rear face to receive the flanged portion 18a of the drum. In order to hold the drum 18 in position on the end of the bushing 15, a circular cover plate 20 is secured into a recess in the rear surface of the dial 14 and held by a plurality of countersunk screws 21, the plate engaging the drum 18 and having a central aperture 22, see Fig. 4, which receives a shoulder 23 embossed in the flat central portion of the drum.

To automatically lock the bushing 15 to the locking drum 18 and quickly release same, when it is desired to turn or adjust the shaft 10, the present invention provides a wedging locking mechanism. For this purpose, as seen in Fig. 4, the portion of the bushing 15 located within the locking drum 18 is made of larger diameter to provide a circumferential flange 24 which has a plurality of reliefs 25, each of which constitutes a pair of oppositely directed wedging surfaces 26 and 27 approaching the drum in opposite directions.

A pair of locking rollers 28 and 29 are located between each of the reliefs 25 and the race 18a of the locking drum, each pair of rollers being yieldably held apart and in locking position by individual coil springs 30, and the size of the rollers being such that they may wedge against the drum to lock the bushing thereto. Accordingly, the sets of rollers 28 and 29 prevent movement of the bushing 15 with respect to the locking drum 18 in opposite directions respectively.

An elongate anchor member or arm 31 having an aperture 32 at one end to loosely receive the shaft 10 is fastened at said end, as by welding, to the annular embossed shoulder portion of the locking drum 18 so that the latter and the anchor arm function as a rigid unit.

To enable the anchor arm 31 to be fastened to the panel 11, so that the locking of the bushing to the drum 18 will cause the shaft 10 to be locked to the panel, the said arm at its other end is provided with an aperture 33.

According to this invention, the aperture 33 in the arm is made elongate, so that the latter may be fastened, as shown, to any one of the fastening screws 12 of the equipment which may be incidental to the mounting of the shaft 10, being required, for instance, for mounting other instruments, and which may lie in a concentric zone spaced from the shaft 10 and defined by the aperture 33. Thus, when the unit is installed on existing equipment it is generally possible to affix the anchor arm 31 to the panel 11 without drilling any additional holes or providing other special fastening means.

For the purpose of selectively unlocking the bushing 15 so that it and the shaft 10 may be turned in one direction or the other, the hub portion of the knob 13 is provided with a plurality of lugs 34 adapted to extend into the space between the flange 24 of the bushing and the race 18a of the locking drum, the lugs extending respectively between adjacent pairs of locking rollers so that they may selectively engage and dislodge one or the other of the sets 28, 29 in response to movement of the knob 13 to one or the other of its limited positions on the bushing 15.

Thus, when the knob 13 is in the intermediate position shown in Fig. 3, the wedging rollers will function to lock the shaft 10 securely to the panel 11. If it is desired to adjust the shaft clockwise it is only necessary to grasp the knob 13 and move same and the dial 14 clockwise. At the initiation of movement of the knob 13, the shaft 10 and bushing 15 will not move, but the lost motion between the screw 16 and the knob will be taken up, and the set of rollers 28 will be thereby dislodged from their wedging positions. As the knob 13 and dial 14 are made to continue their turning, the driving connection to the set screw will cause the bushing 15 and shaft 10 to rotate. When the desired adjustment has been made in the shaft and the knob 13 is released, the springs 30 will function to return the knob and dial to their intermediate positions on the bushings by returning the locking rollers 28 to their wedging positions, and the shaft 10 will again be securely locked to the panel.

In a like manner, counterclockwise turning of the knob 13 and dial 14 will first dislodge the rollers 29 and then drive the bushing 15 and shaft 10 in a counterclockwise direction.

After each adjustment of the shaft 10 as effected by turning of the knob 13 and dial 14, the latter two will be returned to their intermediate positions on the bushing 15, and the dial will indicate within a fraction of a degree the setting of the shaft 10.

Where it is desired to obtain more precise readings indicative of the position of the shaft 10 than provided by the dial 14, the bushing 15 may be extended through the aligned apertures of the drum 18 and anchor arm 31 and a pointer or a second dial of sheet-like material affixed to this extension to move therewith. For this purpose the arm 31 may be spaced from the panel 11 an extent, as by a washer between these parts at the bolt 12, to provide room for the pointer.

Variations and modifications may be made within the scope of this invention and portions of the improvements may be used without others.

I claim:

1. Operating and locking means adapted to be mounted as a unit on a rotatable shaft extending from a panel or the like support, comprising a knob adapted to be carried by the shaft; a member rotatably mounted with respect to the knob having an anchor portion including an apertured arm extending away from the shaft to overlie the panel, said arm having means enabling it to be fastened to an adjacent surface of the panel at any selected point thereon in a predetermined zone spaced from the shaft, to fix the member to said surface; means for locking the shaft to the member; and means for releasing the locking means and turning the shaft when the knob is turned, said locking means automatically becoming operative again when the knob is released.

2. Operating and locking means adapted to be mounted as a unit on a rotatable shaft extending through a panel which has a plurality of incidental spaced fastening means located at different distances from the shaft, at least one of said fastening means lying in a predetermined zone spaced from the shaft, comprising a knob adapted to be carried by the shaft; a member rotatably mounted with respect to the knob, having an anchor portion extending away from the shaft, said portion having means enabling it to be fastened to any of the fastening means of the panel located within said predetermined zone to fix the member to the panel; means for locking the shaft to the member; and means for releasing the locking means and turning the shaft when the knob is turned, said locking means automatically becoming operative again when the knob is released.

3. The invention as defined in claim 1 in which the knob has means by which it is adapted to move relatively to the shaft between two limits and to connect positively at said limits to drive the shaft, and in which the means for releasing the locking means is operative when the knob is at either of said limits.

4. The invention as defined in claim 1 in which the knob has means by which it is adapted to move relatively to the shaft between two limits and to connect positively at said limits to drive the shaft, in which the means for releasing the locking means is operative when the knob is at either of said limits, and in which there are means for yieldably holding the knob in a position intermediate said limits.

5. Operating and locking means adapted to be mounted as a unit on a rotatable shaft projecting through a support, comprising a body adapted to be fastened to the shaft; a knob rotatable on the body between two limits, and having a positive connection at said limits to drive the body; a member rotatably mounted with respect to the body, having an anchor portion extending away from the shaft and overlying the support and having means enabling it to be fastened to an adjacent surface of the support by existing fastenings at any selected point thereon in a predetermined zone spaced from the shaft, to fix the member to said surface; means for locking the body to the member; and means for releasing the locking means when the knob is turned to one of said limits so that further turning of the knob causes the shaft to turn, said locking means automatically becoming operative again when the knob is released.

6. The invention as defined in claim 5 in which there are means for yieldably holding the knob in a position intermediate said limits wherein the locking means are operative.

7. Operating and locking means adapted to be mounted as a unit on a rotatable shaft projecting through a support, comprising a body adapted to be fastened to the shaft, and a member rotatably mounted with respect to the body, each having juxtaposed parts, one of said parts having a track and the other a wedging surface spaced from and inclined to the track; a wedging means, and means for yieldably holding same in wedging engagement with the track and wedging surface to prevent movement of the body with respect to the member, the latter having an anchor portion extending away from the shaft and overlying the support and having means enabling it to be fastened to an adjacent surface of the support by existing fastenings at any selected point thereon in a predetermined zone spaced from the shaft; a knob rotatable on the body between two positions, and having a positive connection at one of said positions to drive the body; and means for moving the wedging means out of wedging position to permit moving the body and shaft when the knob is moved to said one position connecting positively to said body, whereby continued movement of the knob will drive the shaft.

8. Operating and locking means adapted to be mounted as a unit on a rotatable shaft projecting from a support, comprising a body adapted to be fastened to the shaft, and a member rotatably mounted with respect to the body, each having juxtaposed parts, one of said parts having a track and the other a pair of oppositely directed wedging surfaces spaced from and inclined to the track; a pair of wedging means located between said wedging surfaces and track; means for yieldably holding the wedging means in wedging position against the track and wedging surfaces to lock the body to the said member, the latter having an anchor portion extending away from the shaft and overlying the support and having means enabling it to be fastened to an adjacent surface of the support at any selected point by existing fastenings thereon in a predetermined zone spaced from the shaft; a knob rotatable on the body between two limits and having a positive connection at said limits to drive the body; and means for moving one or the other of the wedging means out of its wedging position to permit moving the body and shaft when the knob is moved to one or the other of said limits respectively, whereby continued movement of the knob will drive the shaft.

9. The invention as defined in claim 7 in which the means for yieldably holding the wedging means in wedging position returns the knob to its other position when the latter is released after driving the shaft.

10. Operating and locking means adapted to be mounted as a unit on a rotatable shaft extending from a panel or the like support, comprising a knob adapted to be carried by the shaft; a member rotatably mounted with respect to the knob having an anchor portion including an arm extending away from the shaft to overlie the panel, said arm having an elongate aperture therein enabling it to be fastened to an adjacent surface of the panel at any selected point thereon in a predetermined zone spaced from the shaft, to fix the member to said surface; means for locking the shaft to the member; and means for releasing the locking means and turning the shaft when the knob is turned, said locking means automatically becoming operative again when the knob is released.

11. Operating and locking means adapted to be mounted as a unit on a rotatable shaft extending through a panel, comprising a bushing for receiving said shaft, having shaft-gripping means; a brake drum for encircling the shaft, having an anchoring arm extending away from the shaft, said arm having means enabling it to be fastened at any selected point thereon in a zone spaced from the shaft, said drum being rotatably mounted with respect to the bushing, and the latter having a pair of oppositely directed wedging surfaces extending inside the drum and spaced from and inclined to same; a pair of wedging rollers located between the wedging surfaces and the drum; spring means for yieldably holding the rollers in wedging position against the wedging surfaces and drum to lock the bushing to the latter; and a knob rotatable on the bushing between two limits, and having a positive connection at said limits to drive the bushing, said knob having means extending inside the drum for engaging and dislodging one or the other of the rollers in response to movement of the knob to one or the other of its limits, said spring means operating to yieldably hold the knob in a position intermediate its limits, so that the bushing and shaft may be unlocked and turned in one direction or the other by turning the knob to one or the other of said limits and then continuing said turning, the bushing and shaft being automatically again locked upon release of the knob and return of same to said intermediate position by the said spring means.

12. The invention as defined in claim 11 in which the shaft-gripping means of the bushing cooperates with the knob to provide the positive driving connection thereof at said limits.

13. Operating and locking means adapted to be mounted as a unit on a rotatable shaft extending through a panel, comprising a bushing for receiving said shaft, having shaft-gripping means; a brake drum rotatably mounted on one end of the bushing to extend over a portion of the latter, said bushing having a pair of oppositely directed wedging surfaces extending inside the drum, spaced from and inclined to same; a pair of wedging rollers located between the wedging surfaces and the drum; spring means for yieldably holding the rollers in wedging position against the wedging surfaces and drum to lock the bushing to the latter; a knob rotatable on the other end of the bushing between two limits, and having a positive connection at said limits to drive the bushing, said knob having a dial encompassing said one bushing end; a plate removably fastened to the back of the dial and engaging the brake drum to hold same in position on the bushing, said plate having an aperture to provide access to the drum; an anchor arm fastened to the brake drum through the aperture in the plate, extending along the surface of the panel in a direction away from the shaft, said arm having means enabling it to be fastened to any selected point on the panel in a zone spaced from said shaft; and means connected to the knob and extending inside the brake drum for engaging and dislodging one or the other of the rollers in response to movement of the knob to one or the other of its limits, said spring means operating to yieldably hold the knob in a position intermediate said limits, so that the bushing and shaft may be unlocked and turned in one direction or the other by turning the knob to one or the other of said limits and then continuing said turning, the bushing and shaft being automatically again locked upon release of the knob and return of same to said intermediate position by the said spring means.

14. The combination of a rotatable shaft; a panel through which the shaft extends; a knob carried on the shaft; a member rotatable with respect to the shaft having an anchor portion extending beyond the periphery of the knob and along the surface of the panel away from the shaft, said portion having means beyond the periphery of the knob enabling it to be fastened to the panel at any selected point thereon in a zone spaced from the shaft to fix said member to the panel; means for locking the shaft to the member; and means for releasing the locking means and turning the shaft when the knob is turned, said locking means automatically becoming operative again when the knob is released.

15. The combination of a rotatable shaft; a panel through which the shaft extends; a knob carried on the shaft; a member rotatable with respect to the shaft having an anchor portion including an arm extending along the surface of the panel away from the shaft, said arm having means enabling it to be fastened to the panel at any selected point thereon in a zone spaced from the shaft to fix said member to the panel; means for automatically locking the shaft to the member; and means for releasing the locking means and turning the shaft when the knob is turned, including means for yieldably holding the knob in a predetermined non-releasing position on the shaft wherein the locking means is operative so that when the knob is released the shaft is automatically locked in its new setting.

16. The combination of a rotatable shaft; a panel through which the shaft extends; a knob rotatable on the shaft between two limits, and having a positive connection at said limits to drive the shaft; a member rotatable with respect to the shaft and knob, having an anchor portion including an arm extending therefrom along the surface of the panel, said arm having means enabling it to be fastened to the panel at any selected point thereon in a zone spaced from the shaft to fix said member to the panel; means for locking the shaft to said member; and means for releasing the locking means and turning the shaft in one direction or the other when the knob is turned in one direction or the other, said locking means automatically becoming operative again when the knob is released.

LOUIS SPRARAGEN.

REFERENCES CITED

The following references are of record in the file of this patent:

UNITED STATES PATENTS

| Number | Name | Date |
| --- | --- | --- |
| 922,138 | Hendler | May 18, 1909 |
| 945,909 | Chapman | Jan. 11, 1910 |
| 1,277,800 | Westfall | Sept. 3, 1918 |
| 1,537,223 | Clas | May 12, 1925 |
| 1,577,714 | Hayden | Mar. 23, 1926 |
| 1,595,499 | Birk | Aug. 10, 1926 |
| 1,774,843 | Petit | Sept. 2, 1930 |
| 2,276,777 | Horton | Mar. 17, 1942 |

FOREIGN PATENTS

| Number | Country | Date |
| --- | --- | --- |
| 641,927 | France | Aug. 13, 1928 |